March 29, 1927.  1,622,664
T. E. MURRAY ET AL
HOLLOW STRUCTURE AND METHOD OF MAKING THE SAME
Filed April 21, 1923
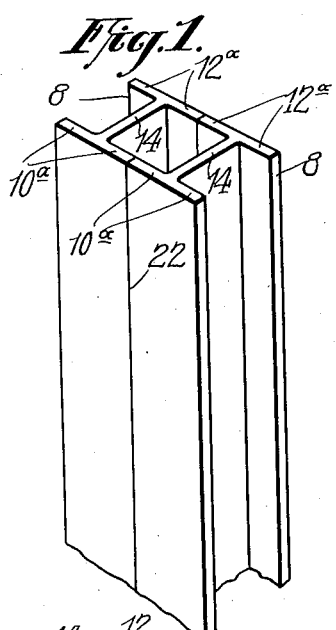
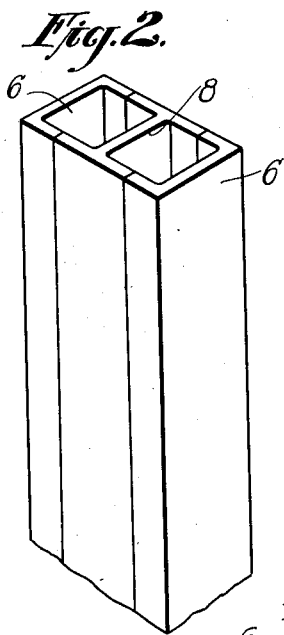
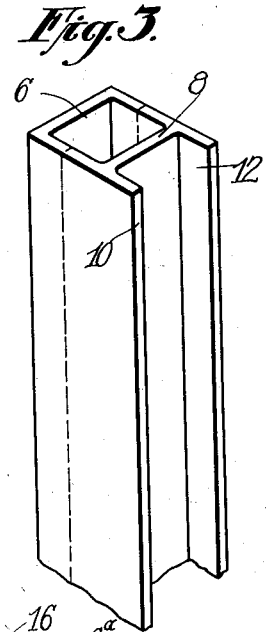
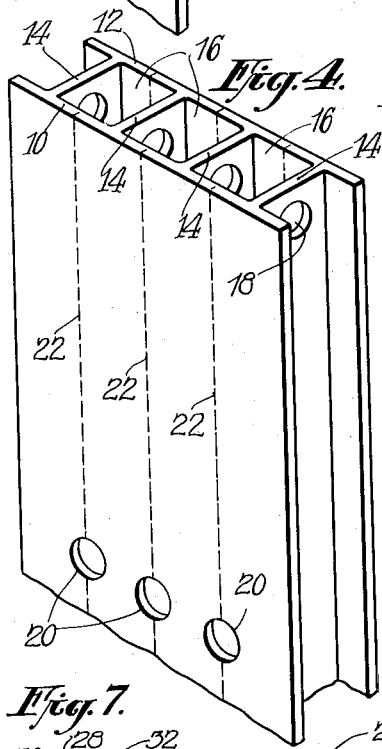
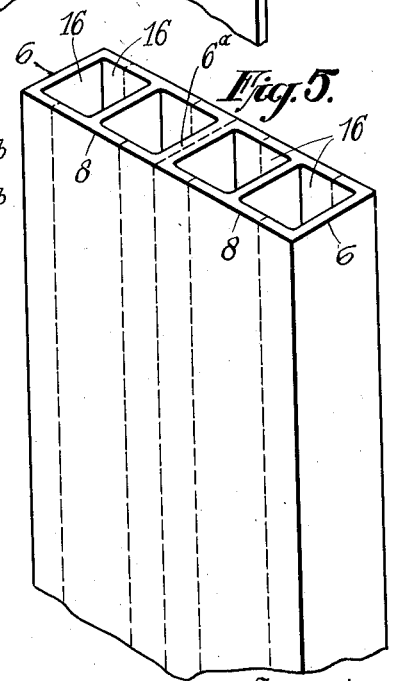
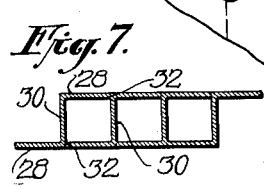
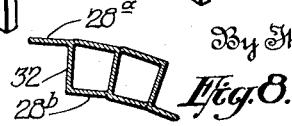
Inventors
Thomas E. Murray.
Thomas E. Murray, Jr.
By their Attorney Patented Mar. 29, 1927.

1,622,664

UNITED STATES PATENT OFFICE.

THOMAS E. MURRAY AND THOMAS E. MURRAY, JR., OF BROOKLYN, NEW YORK.

HOLLOW STRUCTURE AND METHOD OF MAKING THE SAME.

Application filed April 21, 1923. Serial No. 633,611.

Our invention relates to improvements in hollow structures and to the method of making such structures. We aim to provide a structure which can be made of flanged members such as rolled H-beams, channel bars, Z-bars, I-beams, angle bars and the like.

The invention is illustrated in the accompanying drawings in which—

Fig. 1 shows a pair of H-beams placed alongside each other ready to be united;

Fig. 2 is a similar view illustrating an H-beam and a pair of channel bars arranged to be united to the flanged H-beam;

Fig. 3 is a detail illustrating a hollow structure formed by uniting a channel bar to the flanges of an H-beam;

Fig. 4 is a perspective view illustrating a multiple structure embodying our invention and formed according to our improved method, the structure being made up of a multiplicity of H-beams as shown in Fig. 1;

Fig. 5 is a similar view illustrating a similar structure made up of channel bars and H-beams as shown in Fig. 2;

Fig. 6 is a detail view illustrating a slightly modified construction;

Fig. 7 is a horizontal section showing a structure built up of a series of Z-bars having flanges of equal width; and Fig. 8 is a view illustrating a portion of an arcuate structure formed of a series of Z-bars having flanges of unequal widths.

Referring to the drawings, Fig. 4 shows a multiple cellular structure comprising outer walls 10 and 12 connected by transverse walls 14 which divide the structure so as to form a multiplicity of separate chambers 16. The walls 14 as shown in Fig. 4 are apertured as at 18 to provide for communication between the chambers 16 and the wall 10 is apertured at 20 to permit communication from the outside with the chambers 16.

The cellular structure of Fig. 4 is made by our improved method which consists in integrally uniting a plurality of flanged members. To build the structure of Fig. 4 we successively unite a plurality of H-beams to one another. For example, as shown in Fig. 1 the abutting flanges 10$^a$ and 12$^a$ of the beams 8—8 are welded together along the line 22. This joint may be formed by electrically welding the flanges by the passage of a current of high amperage for a brief interval and subjecting the sections to pressure, or the joint may be made by arc welding. These joints will form a fluid tight closure between the adjacent sections.

In Fig. 5 we have shown a multiple cellular structure formed of a series of H-beams 8 and channel sections 6 as shown in Fig. 2. This structure provides a series of fluid tight chambers 16, the structure being made up of a number of identical units each of which comprises an H-section 8 and two channel sections 6 as arranged in Fig. 2. The channel sections 6 being joined web to web. This forms a wall 6$^a$ of double thickness between certain of the chambers 16.

All the parts of the structure of Fig. 5 may be united by welding the abutting flanges of certain sections and the opposed webs of the channel sections. Or if desired the adjacent channel sections can be otherwise connected. For example, in Fig. 6, I have shown the webs 6$^b$ of a pair of channel sections connected by means of a hollow nipple 24, this nipple being spun in place to form a flange 26. Instead of the spun nipple 24 a pipe fitting could be used or, of course, the adjacent sections could be merely bolted together if it is not desired to provide communication between the adjacent chambers 16.

In Fig. 3 is shown a single hollow unit formed by uniting an H-section 8 to a channel section 6. This provides a hollow member having outer flanges 10 and 12 which may serve to radiate heat and also afford convenient means of attachment to various supports and the like.

Fig. 7 illustrates a method of making a hollow structure by welding the flanges 28 of a series of Z-bars 30, the edge 32 of each flange being welded to the opposed surface of the adjacent section. If the width of the flanges 28 of each Z-bar is equal a straight or flat wall can be produced.

By using a series of Z-bars having flanges 28$^a$ and 28$^b$ of unequal length, a curved or substantially arcuate wall can be formed, as in Fig. 8.

Our invention provides a structure which can be economically built up from various rolled structural steel shapes and also provides an improved method for making such structures.

Structures of the kind described can be used for many purposes; for example, in the construction of furnace walls, boiler tubes, refrigerating chambers and in countless other installations where it is required to circulate a fluid through a number of chambers or where it is merely desired to space one wall from another to form an insulating chamber or chambers between such walls.

While it is preferred to build our structure from rolled sections we do not limit ourselves thereto as it is clear that pressed or forged metal sections of various configurations may be employed.

While we have described with great particularity specific embodiments of our invention and the method of production is not to be construed that we are limited thereto as changes may be made by those skilled in the art without departing from the invention as defined in the appended claims.

What we claim is—

1. The method of making a multiple cellular structure for the circulation of fluids, which consists in arranging rolled structural steel H-shapes or the like adjacent to one another with the edges of their flanges abutting and electrically welding such edges together to form a fluid-tight structure with adjacent cells which are separated from one another by single webs of said shapes.

2. The method of making a cellular structure for the circulation of fluids, of the width of one cell and the length of a plurality of cells, which consists in arranging rolled structural steel flanged shapes adjacent to one another in serial arrangement with abutting flanges and with webs forming partitions of single thickness between successive cells, and electrically welding such edges to form a fluid-tight structure of the character described.

3. A multiple cellular structure for the circulation of fluids comprising rolled structural steel H-shapes or the like adjacent to one another with the edges of their flanges abutting and integrally united to one another to form a fluid-tight structure with adjacent cells which are separated from one another by single webs of said shapes.

4. A cellular structure for the circulation of fluids, of the width of one cell and the length of a plurality of cells, comprising rolled structural steel flanged shapes adjacent to one another in serial arrangement with abutting edges integrally united to one another and with webs forming partitions of single thickness between successive cells.

In witness whereof, we have hereunto signed our names.

THOMAS E. MURRAY.
THOMAS E. MURRAY, Jr.